United States Patent [19]

Dyott

[11] Patent Number: 4,712,866
[45] Date of Patent: Dec. 15, 1987

[54] INDIUM-CLAD FIBER-OPTIC POLARIZER

[75] Inventor: Richard B. Dyott, Orland Park, Ill.

[73] Assignee: Andrew Corporation, Orland Park, Ill.

[21] Appl. No.: 888,930

[22] Filed: Jul. 24, 1986

[51] Int. Cl.⁴ .............................................. G02B 6/16
[52] U.S. Cl. .............................. 350/96.30; 350/96.33; 350/96.34
[58] Field of Search ............... 350/96.29, 96.30, 96.33, 350/96.34

[56] References Cited

U.S. PATENT DOCUMENTS

| 3,711,262 | 1/1973 | Keck et al. | 65/3.12 |
| 4,106,847 | 8/1978 | Arnaud | 350/96.31 |
| 4,274,854 | 6/1981 | Pleibel et al. | 350/96.30 X |
| 4,307,938 | 12/1981 | Dyott | 350/96.30 |
| 4,354,736 | 10/1982 | Maklad et al. | 350/96.32 |
| 4,354,760 | 10/1982 | Schiffner | 356/350 |
| 4,372,646 | 2/1983 | Strahan et al. | 350/96.31 |
| 4,386,822 | 6/1983 | Bergh | 350/96.15 |
| 4,410,236 | 10/1983 | Schiffner | 350/96.33 |
| 4,410,567 | 10/1983 | France et al. | 350/96.33 X |
| 4,589,728 | 5/1986 | Dyott et al. | 350/96.30 |

OTHER PUBLICATIONS

Eickhoff; "In-Line Fiber-Optic Polariser"; *Electronics Letters*, vol. 16, No. 20, Sep. 25, 1980, pp. 762-764.
Gruchmann et al.; "Fiber-Optic Polarizers with High Extinction Ratio"; ECOC 83-9th European Conference on Optical Communication; pp. 305-308.
Feth et al.; "A Novel In-Line Single-Mode Fiber Optic Polarizer"; Litton Guidance & Control Systems-CA, 1985.
Feth et al.; "Metal-Clad Fiber-Optic Cutoff Polarizer"; Optics Letters, vol. 11, No. 6, Jun. 1986, pp. 386-388.
Hosaka et al.; "Fabrication of Single-Mode Fiber-Type Polarizer"; Optics Letters, vol. 8, No. 2, Feb. 1983, pp. 124-126.
Bergh; "Single-Mode Fiber-Optic Polarizer"; Optics Letter, vol. 5, No. 11, Nov. 1980, pp. 479-481.
Dyott; "Preservation of Polarisation in Optical-Fibre Waveguides with Elliptical Cores"; Electronics Letter, vol. 15, No. 13, Jun. 1979, pp. 380-382.

*Primary Examiner*—John Lee
*Assistant Examiner*—Michael Menz
*Attorney, Agent, or Firm*—Stephen G. Rudisill

[57] ABSTRACT

A fiber-optic polarizer comprising the combination of an optical fiber having a polarization-holding core and cladding with different refractive indices and forming a single-mode guiding region, the guiding region being offset from the center of gravity of the fiber section and located sufficiently close to the surface of one side of the fiber, along a selected length of the fiber, to expose the evanescent field of the guiding region at the surface of the one side to allow coupling to a contiguous medium, the outer surface of the fiber having a non-circular cross-section with a predetermined geometric relationship to the guiding region and a pair of orthogonal polarization axes therein so that the location of the guiding region and the orientation of the axes can be ascertained from the geometry of the outer surface, and a coating of indium on at least the one side of the fiber where the evanescent field is exposed so that light waves having undesired polarizations are attenuated by the indium coating.

5 Claims, 3 Drawing Figures

U.S. Patent   Dec. 15, 1987   Sheet 1 of 2   4,712,866
FIG. 1 (PRIOR ART)
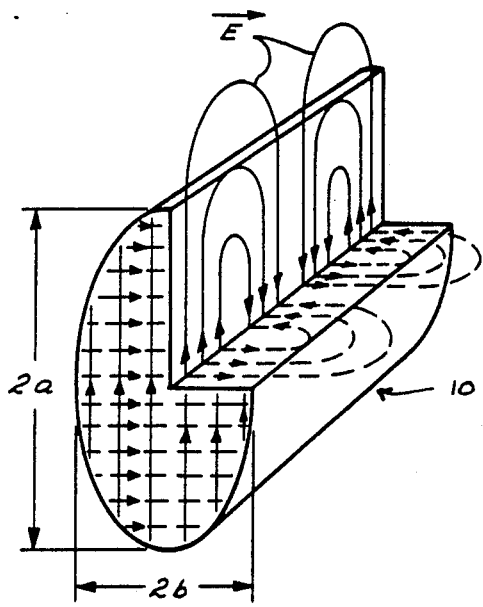
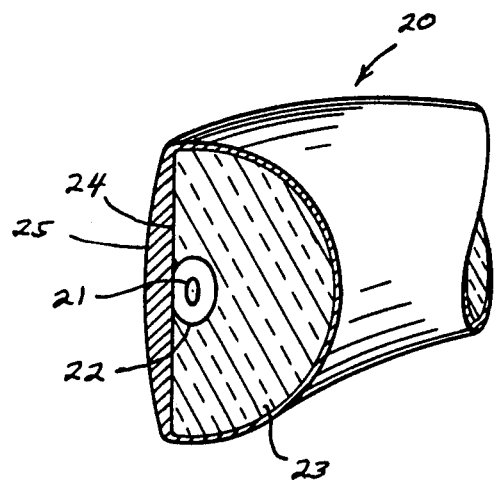
FIG. 2

INDIUM-CLAD FIBER-OPTIC POLARIZER

FIELD OF THE INVENTION

The present invention relates generally to fiber-optic polarizers and, more particularly, to fiber-optic polarizers utilizing metal claddings.

BACKGROUND OF THE INVENTION

Single mode optical fiber sensors are sensitive to the state of polarization of light in the fiber. If the fiber is not significantly polarization-holding or preserving, waves of different polarization may have different phase velocities. Thus, for single-mode transducers, it is desirable to use fibers having geometric birefringence or other kinds of polarization-holding fibers. See, e.g., McMahon et al., "Fiber-Optic Transducers," *IEEE Spectrum*, December 1981, pages 24–27.

Even in an optical fiber that has good polarization-holding properties, however, unwanted guided waves can be present. For example, in an optical fiber having a core with an elliptical cross-section, in which the desired wave is usually polarized along the major axis of the ellipse, an unwanted wave can be present and will be polarized along the minor axis of the ellipse. Such an unwanted wave can originate, for instance, from a laser source which launches imperfectly polarized light into the fiber or from coupling between polarizations in the fiber itself. Although such unwanted waves can be tolerated during transmission, they become extremely undesirable at the output end of the fiber where the phase of the desired wave is sensed and used for various purposes.

Dyott U.S. patent application Ser. No. 404,283, (abandoned) filed Aug. 2, 1982, entitled "Self-Aligning Optical Fiber With Accessible Guiding Region" and assigned to the assignee of the present invention, discloses a self-aligning optical fiber comprising a core and cladding having different refractive indices and forming a guiding region located close to the surface of the fiber along a selected length of the fiber. The core of the fiber has an elliptical cross-section, and the outer surface of the fiber has a non-circular (preferably D-shaped) cross-section with a predetermined geometric relationship to the elliptical core so that the orientation of the major and minor axes of the elliptical core can be ascertained from the geometry of the outer surface. The elliptical cross-section of the core in combination with the different refractive indices of the core and cladding permit the de-coupling of waves polarized along such axes.

While an optical fiber of the type disclosed in the Dyott application permits the de-coupling of waves polarized along two transverse orthogonal axes, a separate polarizing device or polarizer is required to suppress the waveguide's ability to guide one of the two orthogonally polarized modes (e.g., the $_eHE_{11}$ mode) and to cause the waveguide to guide only the other mode (e.g., the $_oHE_{11}$ mode) and thereby limit the waveguide to true single-mode operation.

SUMMARY OF THE INVENTION

It is a primary object of the present invention to provide an improved metal-clad fiber-optic polarizer which provides the combination of a high extinction ratio in combination with a low insertion loss.

Another important object of this invention is to provide such an improved metal-clad fiber-optic polarizer which can be efficiently and economically manufactured. In this connection, related objects of the invention are to provide such a polarizer which does not require vacuum evaporation of the metal onto the fiber, and which does not require the deposition of a separate buffer layer before the metal cladding is deposited.

Another object of this invention is to provide such an improved metal-clad fiber-optic polarizer which allows the metal cladding to be applied from a metal in liquid rather than gaseous form.

Other objects and advantages of the invention will be apparent from the following detailed description and the accompanying drawings.

In accordance with the present invention, the foregoing objectives are realized by providing a fiber-optic polarizer comprising the combination of an optical fiber having a core and cladding with different refractive indices and forming a single-mode guiding region, the core having a non-circular cross-section defining two transverse orthogonal axes which, in combination with the different refractive indices, de-couple waves polarized along the orthogonal axes, the guiding region being offset from the center of gravity of the fiber cladding and located sufficiently close to the surface of one side of the fiber, along a selected length of the fiber, to expose the evanescent field of the guiding region at the surface of that one side to allow coupling to a contiguous medium, the outer surface of the fiber having a non-circular cross-section with a predetermined geometric relationship to the guiding region and the orthogonal transverse axes so that the location of the guiding region and the orientation of the axes can be ascertained from the geometry of the outer surface; and a coating of indium on the side of the fiber where said evanescent field is exposed so that light waves having undesired polarizations are absorbed by the indium coating.

BRIEF DESCRIPTION OF THE DRAWINGS

FIG. 1, labeled PRIOR ART, is a diagrammatic perspective view, in partial section, illustrating the electric and magnetic fields in their preferred directions of polarization in the elliptical core of a single-mode optical fiber waveguide;

FIG. 2 is a perspective view of a fiber-optic polarizer according to one preferred embodiment of the present invention.

DESCRIPTION OF THE PREFERRED EMBODIMENTS

Figure 3:
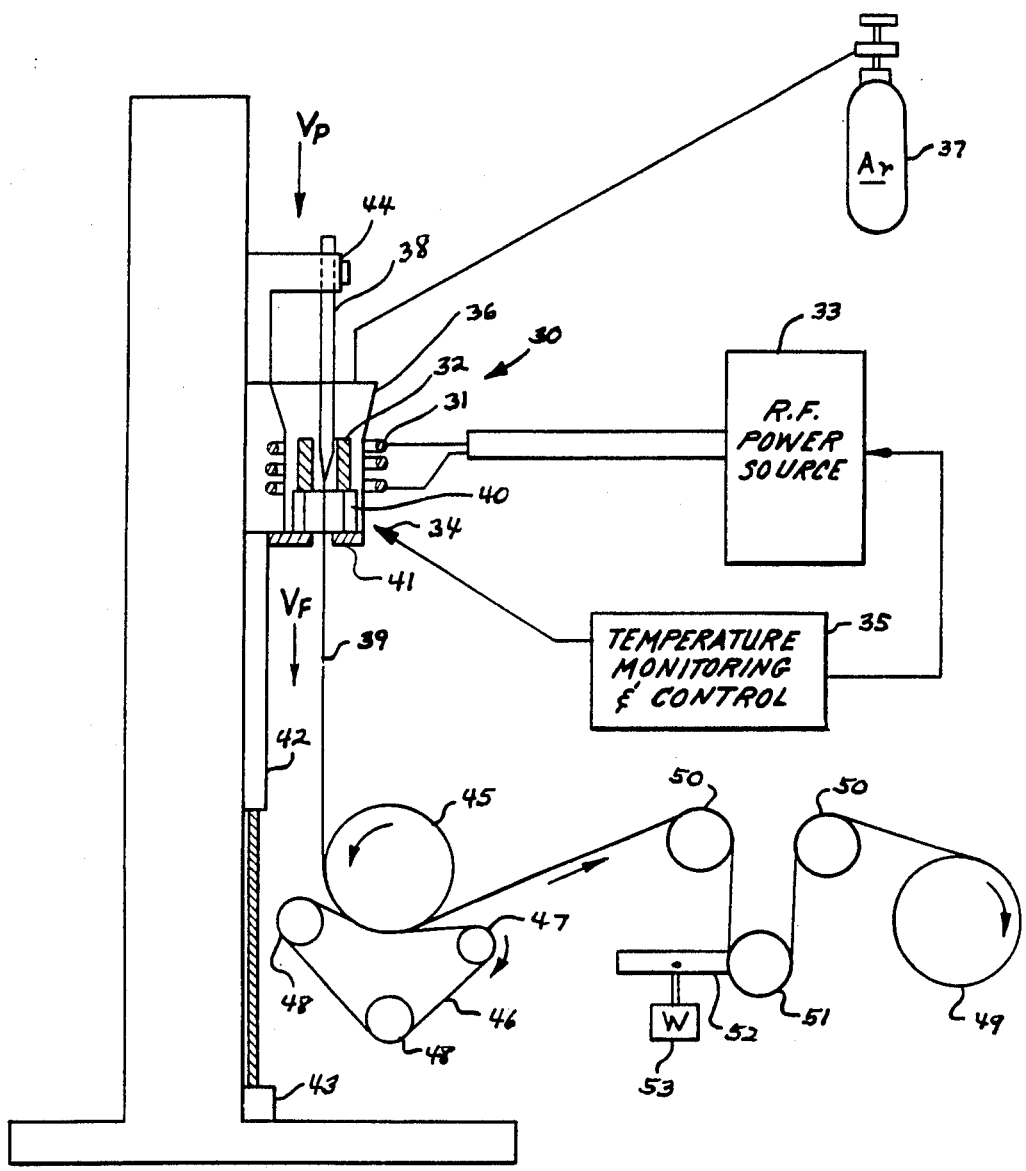
FIG. 3 is a partially schematic side elevation of a preferred system for forming the optical fiber which is used in the polarizer of the present invention.

Turning now to FIG. 1, there is shown a dielectric core 10 for supporting the propagation of electromagnetic fields E, H in the axial direction. This particular core 10 has an elliptical cross-section with a major diameter $2a$ and a minor diameter $2b$. An optical fiber having such a core 10 with a relatively high dielectric constant/index of refraction tends to confine and guide electromagnetic energy (i.e., light) along the axis of the core. It is known that if the index of refraction of the core 10 is properly chosen in relation to the index of refraction of the surrounding medium, the core dimensions a, b, and the wavelength of the light, the distribution of the fields E and H will tend to occur in a well-defined pattern, or mode. Shown in FIG. 1 is the field pattern for the $_oHE_{11}$ mode.

Well-defined field patterns have the advantage of facilitating the coupling of the fiber to optical devices. Another advantage is that the attributes of the light propagation, such as phase velocity and group velocity, are relatively constant as the light propagates down the fiber. The group velocity specifies how fast modulation or information travels down the fiber. Thus, for transmitting information over long distances it is important that the group velocity be relatively constant and in particular independent of frequency so that the information will be localized at a specific region rather than becoming "smeared out" as the information travels down the fiber. A single phase velocity is important in fiber-optic sensor applications where the phase of a wave in a sensor fiber is compared to the phase of a reference wave in a reference fiber.

Single-mode propagation does not, however, guarantee that the polarization of a wave is fixed in any definite or constant angular relationship with respect to the core 10. Polarization is defined as the direction of the electric field vector E. Thus, as shown in FIG. 1, the light is polarized in a vertical direction, along the major axis of the ellipse.

To maintain or preserve the polarization of a signal in an optical fiber, the optical properties of the fiber must be anisotropic, or in other words a function of the angle of polarization with respect to the fiber. One method of making the optical fiber anisotropic is to make the core 10 have a cross-section which is elliptical or some other non-circular shape which defines two transverse orthogonal axes permitting the de-coupling of waves polarized along those axes. A wave which is launched into such a fiber in alignment with one of the transverse axes tends to remain aligned with that axis as the wave is propagated through the fiber, thereby preserving the polarization of the wave.

In the illustrative embodiment of FIG. 2, an optical fiber 20 has an elliptical core 21 with a relatively high index of refraction $n_1$ surrounded by a cladding 22 with a lower index of refraction $n_2$ to produce a high index difference $\Delta n$ (e.g., a $\Delta n$ of 0.06). The dimensions and the refractive indices of the core 21 and the cladding 22 are selected to provide a single-mode guiding region. Because of its elliptical shape and high index difference, this guiding region will also hold the polarization of optical signals propagated therethrough in alignment with either axis of the ellipse. That is, the major and minor axes of the elliptical cross-section represent two transverse orthogonal axes which, in combination with the refractive indices of the core and cladding, de-couple light waves polarized along those axes.

Surrounding the guiding region formed by the core 21 and cladding 22 is a support layer 23 which provides the fiber with increased mechanical strength and ease of manipulation. Since this support layer 23 is not a part of the guiding region, its optical properties are not nearly as critical as those of the core 21 and the cladding 22. To prevent light from being trapped in the cladding 22, the support layer 23 has an index of refraction higher than that of the cladding 22.

The outer surface of the fiber as defined by the support layer 23 in FIG. 2 has a D-shaped cross-section, with the flat surface 24 of the D extending parallel to the major axis of the elliptical guiding region on the side of the fiber closest to the guiding region. The flat surface 24 of this D-shaped optical fiber can be used as an indexing surface. The guiding region of the D-shaped fiber 20 of FIG. 2 is preferably offset or displaced from the geometric center (i.e., centroid of mass or center of gravity of the transverse section) toward the flat 24 of the D along the perpendicular-bisector of the flat.

By removing a thin portion of the support layer 23 and also a portion of the cladding 22, (e.g., by etching), the guiding region formed by the core 21 and cladding 22 can be located sufficiently close to the surface of the fiber to expose the evanescent field. As an alternative, a selected segment of the fiber can be drawn to reduce the fiber diameter within that segment and thereby expand the field of the guiding region sufficiently to expose the field on the flat surface of the fiber.

In accordance with the present invention, the guiding region of the optical fiber is located sufficiently close to the surface of one side of the fiber, along a selected length of the fiber, to expose the evanescent field of the guiding region at the surface of that side of the fiber, and the fiber surface where the evanescent field is exposed is coated with indium so that light waves having undesired polarizations are absorbed by the indium coating. It has been found that indium has a unique combination of properties that are particularly useful in fiber optic polarizers. Thus, indium has the requisite optical properties in that it has a complex refractive index in which the imaginary part is sufficiently high to provide a high extinction ratio, while at the same time providing a low insertion loss. As will be described in more detail below, polarizers embodying this invention have exhibited extinction ratios in excess of 42 dB with insertion losses of less than one dB. Indium also has the unique ability to wet glass when the indium is in a molten condition, and the melting temperature of indium is low enough that molten indium does not melt most glasses when it is applied thereto. When the molten indium solidifies after being applied to the glass, the solid indium metal is firmly bonded to the glass. Forming the metal coating in this manner, from a molten metal rather than a metal which is in gaseous form (e.g., as in vacuum evaporation), produces a continuous metal coating without any perforations, thereby providing superior optical properties.

The molten indium should be applied to the fiber in the presence of oxygen. Although it is not intended to limit the invention to any particular theory, it is believed that a thin layer of indium oxide forms between the fiber surface and the coating of molten indium, and that this oxide contributes to the formation of a strong bond between the indium and the glass fiber.

The $_oHE_{11}$ and $_eHE_{11}$ waves propagating in the elliptically cored fiber induce $TE_o$ and $TM_o$ plasmon waves respectively at the indum interface. The $TM_o$ wave is preferentially attenuated by the damping of the free electrons (within the indium) that occurs when the frequency of the light wave is greater than the plasma frequency. It is possible that the intermediate layer of indium oxide matches the propagation constant of the $TM_o$ plasmon wave to that of the $_eHE_{11}$ wave in the elliptically cored fiber, resulting in an increased extinction ratio.

In the exemplary embodiment of FIG. 2, an indium coating 25 is formed on the flat surface 24 so that the indium covers the exposed portion of the cladding 22. This polarizer is preferably made by forming a preform having the desired transverse cross-sectional configuration; drawing an optical fiber from the preform, with the drawing rate and temperature being controlled to produce a fiber with a cross-sectional configuration similar to that of the preform; exposing the evanescent field of the guiding region on one surface of the fiber; and applying a coating of indium to the exposed guiding region. Thus, the preform can have the same cross-sectional configuration as the fiber 20 illustrated in FIG. 2, though on a larger scale.

Such a preform can be made by first forming a cylindrical preform with an elliptical core and cladding located in the center thereof (using techniques known in the art), and then grinding one side of the preform to form a cross-section having a flat surface parallel to the major axis of the elliptical core. An optical fiber is then drawn from the ground preform at a drawing rate and temperature controlled to produce the fiber 20 of FIG. 2, i.e., with a cross-sectional geometry substantially the same as that of the preform but on a smaller scale.

A drawing machine suitable for precise control of the drawing process is shown in FIG. 3. In order to heat the preform to approximately the softening temperature, the central component of the drawing machine is an induction furnace generally designated 30 comprising an external induction coil 31 and an internal graphite toroid 32. The toroid 32 is approximately 4 inches long, an inch in diameter, and has a core hole about a quarter inch in diameter. The induction coil 31 is energized by a radio-frequency power source 33 so that the electrical heating currents are induced in the graphite toroid 32, the resulting temperature being measured by an optical pyrometer 34 and monitored by a control unit 35 which controls the power source 33. In order to prevent the graphite toroid 32 from burning, the toroid 32 is disposed within a glass cylinder 36 which is filled with a relatively inert gas such as argon from a supply 37.

A preform 38 is fed into the top of the cylinder 36 so that it extends downwardly through the center of the graphite toroid 32. The toroid 32 is heated white hot, causing the preform 32 to soften. The drawing of the fiber 39 from the preform 38 occurs approximately at the center of the toroid 32. The toroid 32 has legs 40 which stand on a support ring 41 attached to the glass cylinder 36.

The critical parameters affecting the drawing process are the feed rate $V_p$ of the preform 38 toward the drawing point, the temperature at the drawing point, and the rate $V_f$ at which the fiber 39 is drawn from the drawing point. The temperature and rate of drawing $V_f$ set the tension at which the fiber 39 is drawn. The rate of feed $V_p$ of the preform is established by a vertical linear slide generally designated 42 having a lead screw driven by a drive motor 43. At the upper end of the slide 42 is a block 44 containing a V groove into which the top of the preform 38 is clamped. The rate of drawing $V_f$ is established by a capstan wheel 45 below the lower end of the glass cylinder 36. The fiber is gripped between the capstan wheel 45 and a flexible plastic belt 46 which is driven by a capstan motor spindle 47 and spaced by two idler rolls 48. The fiber is then wound onto a drum 49 by a take-up mechanism consisting of two fixed idler pulleys 50 and a movable pulley 51 attached to a dancer arm 52 carrying a weight 53. The arm 52 actuates a conventional speed control for the take-up drum 49 so that fiber is wound onto the drum 49 at a tension determined by the weight 53. The fiber is preferably oriented so that the curved surface of the fiber engages the surfaces of the capstan wheel 45 and the drum 49, so that the guiding region of the fiber is located on the side having the larger radius of curvature to minimize the stress on the guiding region.

In one particular example, a preform was made by depositing a pure silica cladding and germania core on the inside surface of a silica tube. The cladding and core were formed by the thermal decomposition of silicon tetrachloride and germanium tetrachloride, which were circulated through the bore of the silica tube at approximately 1800° C. in an induction furnace. Diametrically opposed portions of the outside surface of the silica tube were then ground flat, after which the tube was collapsed and lightly drawn to form a preform having an outer surface with a cylindrical cross-section with a diameter of about 2.8 mm. and a central core and cladding of elliptical cross-section. One side of the elliptical-core preform was then ground flat, with the plane of the flat surface extending parallel to the major axis of the elliptical core within a few thousands of an inch of the cladding.

An optical fiber was then drawn from the ground preform at a temperature of about 1550° C. while feeding the preform at a rate of about 0.3 mm/sec. and while pulling fiber from the preform at a rate of about 0.5 m/sec. These parameters were chosen to result in a drawing tension as high as practical without breaking the fiber. The resulting fiber had the cross-sectional configuration illustrated in FIG. 2, because the shape of the cross-section was retained as the preform was drawn into a fiber due to the high drawing tension, the relatively small diameter of the preform, and the precise temperature and localized heating of the induction furnace.

In order to expose the guiding region of the fiber before applying the indium coating, a 3.5-cm. length of the fiber was etched with a 10% concentration of hydrofluoric acid. The acid is allowed to remain in contact with the fiber for about fifty minutes and then removed with distilled water. The etching exposed the cladding on the flat side of the fiber.

Next, an indium coating was applied to the etched surface of the fiber using a conventional soldering iron to stroke on molten indium at a temperature of about 190° C., and then allowing the molten metal to solidify. When the indium solidified, it was firmly bonded to the glass with a cross-sectional configuration like that illustrated in FIG. 2. The maximum thickness of the indium on the flat side of the fiber was about 5 microns, and the average thickness around the circular portion of the fiber was about 1.5 microns.

The resulting indium-coated section of fiber was then tested to determine its extinction ratio and insertion loss, using unpolarized white light filtered to pass a bandwidth greater than 20 nm. at an operating wavelength of 830 nm. The filtered light was launched into one end of the fiber using a zero birefringence microscope objective lens of magnification 40. Light from the other end of the fiber was collected by an identical lens and sent through a crystal polarizer to a detector. The output of the detector was monitored as the crystal polarizer was rotated and the extinction ratio determined by:

$$R = 10 \log_{10} \left[ \frac{\text{Detector Max}}{\text{Detector Min}} \right] \text{ dB}$$

The insertion loss was found by setting the polarizer for maximum detector output, cutting the fiber at the input end of the polarizer (before the indium-coated section itself), and transferring the detector to the cut end, taking care not to disturb the launching conditions. The insertion loss was determined by:

$$\alpha = 10 \log_{10} \left[ \frac{\text{Detector reading at cut end}}{\text{Detector reading through polarizer}} \right] dB$$

The results were as follows:
Detector max.=0.16 v.
Detector min.=10 μv
R=42.04 dB
Detector reading at cut end=0.19 v
Detector reading through polarizer=0.16 v
α=0.75 dB An alternative method of exposing the guiding region of the fiber before applying the indium coating is to grind the flat side of the D-shaped, elliptical-core preform deeply enough to cause the elliptical cladding to be slightly exposed in the drawn fiber, at least at selected locations along the length of the preform where it is desire to form polarizers in the drawn fiber. The indium coating is then applied in the same manner described above. If desired, polarizers can be formed along long lengths of the fiber in this manner.

The term indium as used herein is intended to include both elemental indium and alloys of indium with metals such as silver, tin and lead. Certain of these alloys have melting points higher than that of elemental indium, therby expanding the temperature range of the polarizer.

Although the invention has been described with particular reference to a fiber having an elliptical guiding region, which forms orthogonal axes of birefringence by the geometry of the physical shape of the guiding region, the invention can also be used to advantage with fibers having stress-induced axes of birefringence. In this case, the stress applied to the fiber to produce the birefringence must have a definite orientation relative to the flat surface on the exterior of the fiber so that the internal axes of birefringence can be accurately determined from the external flat surface.

I claim:

1. A fiber-optic polarizer comprising the combination of
   an optical fiber having a polarization-holding core and cladding with different refractive indices and forming a single-mode guiding region,
   said guiding region being offset from the center of gravity of the fiber section and located sufficiently close to the surface of one side of the fiber, along a selected length of the fiber, to expose the evanescent field of the guiding region at the surface of said one side to allow coupling to a contiguous medium,
   the outer surface of the fiber having a non-circular cross-section with a predetermined geometric relationship to said guiding region and a pair of orthogonal polarization axes therein so that the location of said guiding region and the orientation of said axes can be ascertained from the geometry of said outer surface, and
   a coating of indium on at least said one side of the fiber where said evanescent field is exposed so that light waves having undesired polarizations are attenuated by said indium coating.

2. A fiber-optic polarizer as set forth in claim 1 wherein the light waves that are attenuated have a field perpendicular to the interface between said indium coating and the fiber surface where said evanescent field is exposed.

3. A fiber-optic polarizer as set forth in claim 1 wherein said core has a non-circular cross-section defining two transverse orthogonal axes which, in combination with said different refractive indices, de-couple waves polarized along said axes.

4. A fiber-optic polarizer as set forth in claim 1 wherein said core has an elliptical cross-section, the outer surface of said fiber has at least one flat surface which is parallel to one of the transverse axes of said elliptical core, and said coating of indium is on said flat surface.

5. A fiber-optic polarizer as set forth in claim 1 wherein said indium coating is elemental indium.

* * * * *